Sept. 27, 1949.  J. B. MINER  2,483,294
ACETYLENE CUTTING TORCH AND GUIDE
Filed March 5, 1947  3 Sheets-Sheet 1
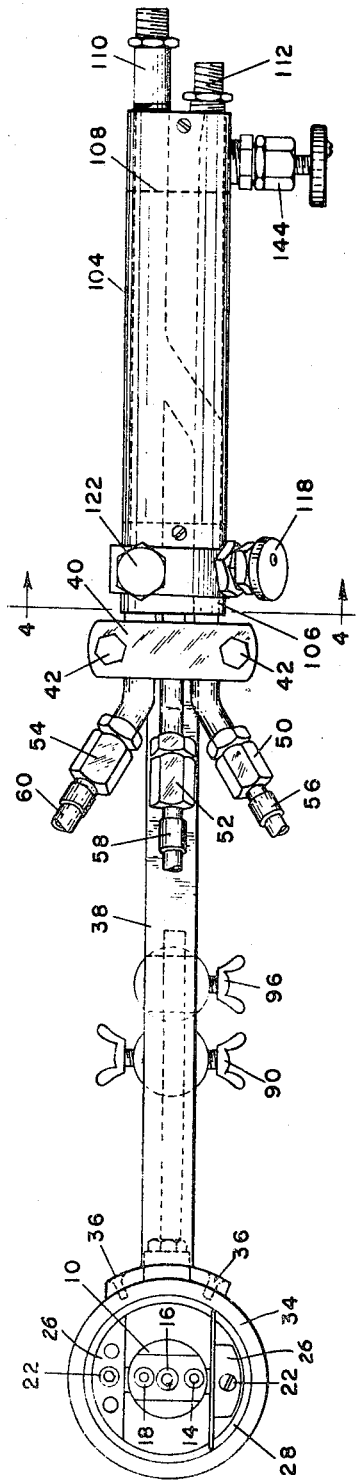
FIGURE 1.
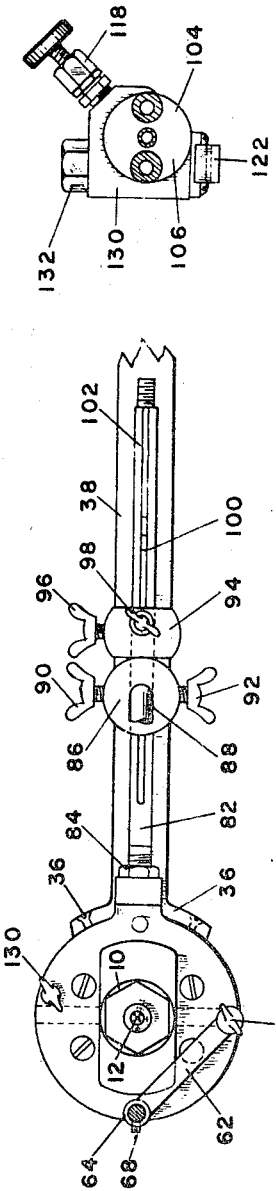
FIGURE 4
FIGURE 3
*INVENTOR.*
JAMES B. MINER
BY *Victor J. Evans & Co.*
ATTORNEYS Sept. 27, 1949.  J. B. MINER  2,483,294
ACETYLENE CUTTING TORCH AND GUIDE
Filed March 5, 1947  3 Sheets-Sheet 2
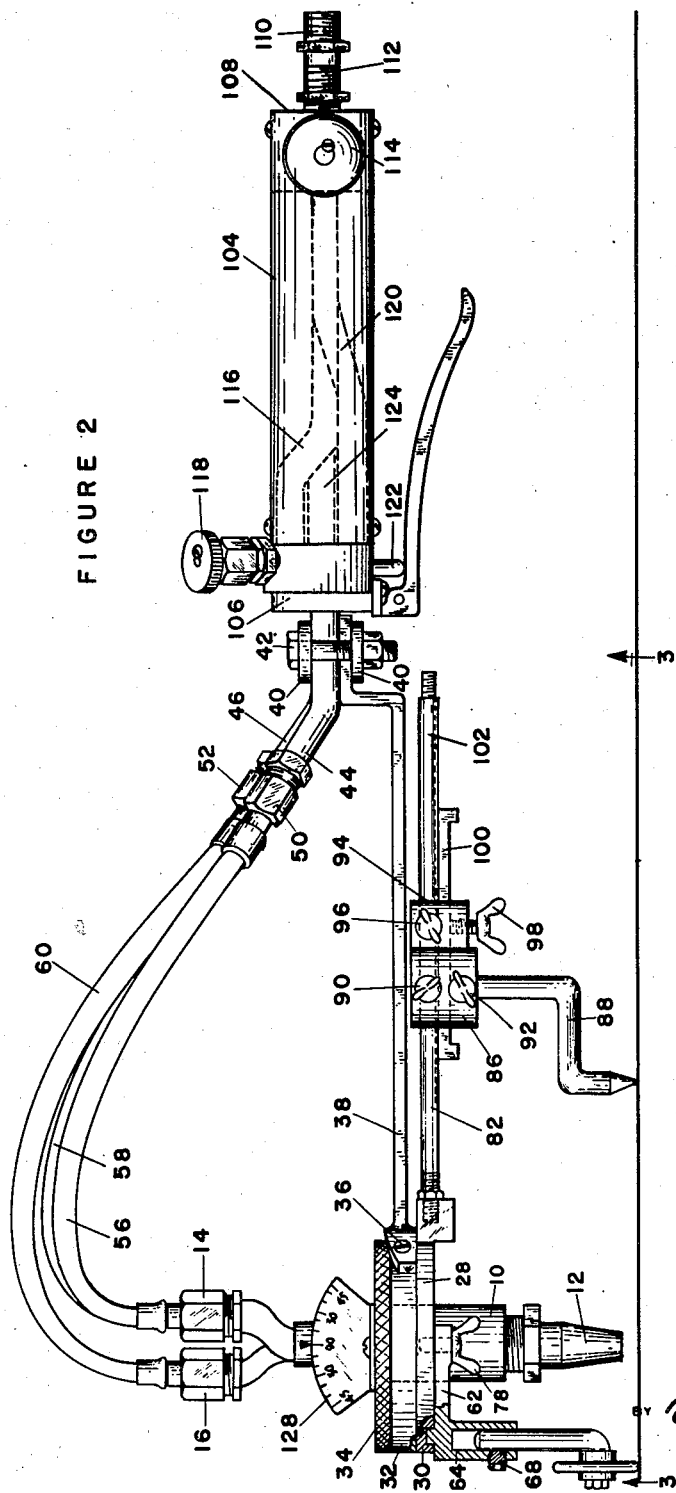
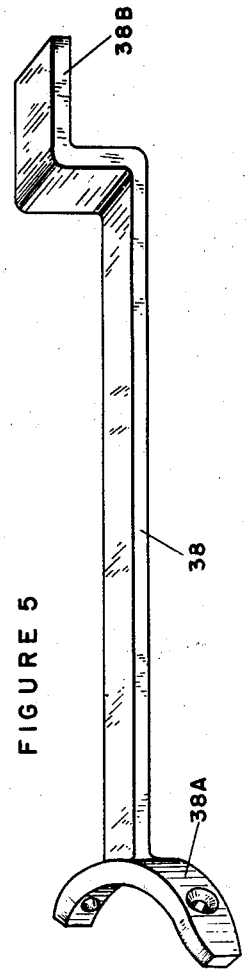
INVENTOR.
JAMES B. MINER
BY Victor J. Evans & Co.
ATTORNEYS Sept. 27, 1949.                    J. B. MINER                    2,483,294
                        ACETYLENE CUTTING TORCH AND GUIDE
Filed March 5, 1947                                          3 Sheets-Sheet 3

INVENTOR.
JAMES B MINER
BY *Victor J. Evans & Co.*
ATTORNEYS

Patented Sept. 27, 1949

2,483,294

UNITED STATES PATENT OFFICE 2,483,294

ACETYLENE CUTTING TORCH AND GUIDE

James B. Miner, Portland, Oreg.

Application March 5, 1947, Serial No. 732,583

1 Claim. (Cl. 266—23)

This invention appertains to improvements in acetylene cutting torches, and has for its primary object to widen the scope of usefulness of the present style of hand-cutting torches, by means of certain structural additions and refinements, which permit of the accurate cutting of bevels generally and radial bevels in particular, without resort to a grinding operation, as ordinarily is required to bring such bevel formations to a desired finish.

Thus, this improved torch structure has the advantage that it produces a radial bevel accurately in a single cutting operation, whereas, ordinarily, to cut such a bevel, three separate operations are required, first, a circle is cut at right angles to the plate; second, the bevel is roughly formed along the edge of the cut; and, third, the roughly beveled edge is subjected to a grinding operation to bring the bevel to an accurate finish.

With the foregoing and other objects and advantages in equal importance in view, the invention resides in the certain new and useful combination, construction, and arrangement of parts, as will be hereinafter more fully described, set forth in the appended claim, and illustrated in the accompanying drawings, wherein:

Figure 1 is a top plan view of the improved cutting torch, in accordance with the invention; the tubes being removed ahead of the couplings to better show the structural features of the upper side of the torch head assembly;

Figure 2 is a side elevation, showing the torch assembly set up for making a circular cut;

Figure 3 is a fragmentary, bottom plan view, of the torch head and the guide assembly therefor;

Figure 4 is a transverse, vertical section, taken through the line 4—4 on Figure 1, looking in the direction of the arrows;

Figure 5 is a perspective view of the main supporting arm per se;

Figure 7:
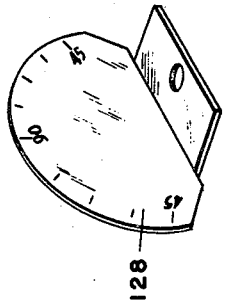
Figure 7 is a perspective view of the indicator plate per se.
Figure 8:
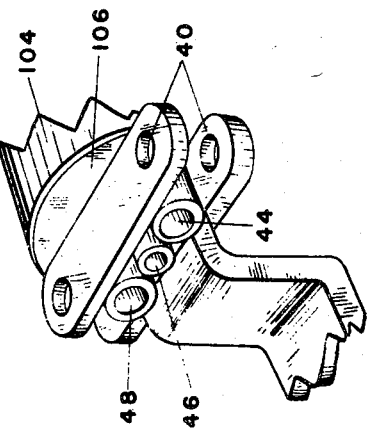
Figure 8 is an enlarged, fragmentary, perspective view, showing the clamp means for securing the main supporting arm to the operating handle of the torch.

Referring to the drawings, wherein like characters of reference denote corresponding parts throughout the several views, the invention, as it is exemplified therein, is comprised in a torch head 10, having a tip 12 at its lower end and fuel supply tube connections 14, 16, and 18, at its upper end. Projecting from opposite sides of the torch head 10 is a pair of lugs 20, preferably circular in cross-section, which seat in bearing boxes 26 and are secured therein by screw clamps, each of which is comprised in a socket-head screw 22 carrying a semi-circular shim 24 engaged over the upper side of a respective lug. The bearing boxes 26 are formed on the inner side of a main supporting ring 28, which is outwardly flanged, as at 30, to engage beneath a guide ring 32, and screw threaded at its upper end to receive a knurled ring nut 34, a sufficient clearance being provided between the ring 28 and ring 32 to permit of substantially free rotation of the main supporting ring, together with the torch-head 10, relatively to the guide ring. The guide ring 32 is rigidly secured, as by screws 36, to one end of a main supporting arm 38, which has its other end secured to the forward end of a handle between clamp plates 40, fastened together by bolts 42, the clamp plates being engaged over fuel outlet connections 44, 46, and 48 (Figure 8), which are provided with couplings 50, 52, and 54, respectively connected to fuel supply tubes 56, 58, and 60, leading to the like couplings of the inlet connections 14, 16, and 18, of the torch-head 10.

Mounted on the lower side of the main supporting ring 28, is an arm 62, which has a downwardly opening socket 64 at one of its ends to receive the upper end of an angled bracket 66, held in place by a socket head screw 68. Journalled on the lower angled end of the bracket 66, is a gauge wheel 70, secured thereon by a nut 72. The arm 62 is provided with a lug 74 on its upper side, in line with the vertical axis of the socket 64, which engages in a recess formed in the lower side of the main supporting ring 28 to set the gauge wheel 70 at one of the bevel cutting positions of the torch-head 10, the arm being swingable to the opposite side of the latter to engage the lug 74 in a second recess, indicated at 76, to set the gauge wheel at a position to reverse the cutting angle, a winged nut 78 being provided on the pivot to hold the arm secure in either of its positions of use. Mounted on the outer side of the main supporting ring 28, is a laterally opening socket 80, which has its bore screw threaded to receive a complementally screw threaded end of a rod 82, the connected end of which is secured by a nut 84. Adjustably supported on the rod 82, is a slide block 86 to support an angled pivot element 88, the block being provided with a winged set screw 90 for its securement to the rod as required and a second winged set screw 92 to secure the pivot element in place. A second slide block 94 is also provided and has a winged set screw 96 for its securement in adjusted position on the rod 82 and a second winged set screw 98 to secure a gauge key 100 in adjustable position on the rod and relatively to the slide block 86, the rod having a groove 102 extending for a major portion of the length of its under side, inward from its free end, the rod being square in cross-section.

The operating handle of the torch-head assembly, as it is thus constructed and arranged, is comprised in a shell 104, having a front end butt 106 and a rear end butt 108. Screwed into the rear end butt 108 are inlet connections 110 and 112, respectively for an oxygen and an acetylene supply line (not shown). An acetylene control valve 114 is screw threaded through the shell and into the butt 108 and by removing it and the connections 110, 112, the shell 104 may be removed. Within the shell 104, a tube 116 extends therethrough from the connection 110 to a cutting valve 118, while a branch tube 120 connects the tube 116 with an oxygen flame control valve 122, and a tube 124 leads from the acetylene control valve 114 and connects with the central outlet connection 46, which, together with the outlet connections 44 and 48, are carried at the front end butt 106, the latter also supporting the valves 118, 122, at the forward end of the shell 104.

Figure 6:
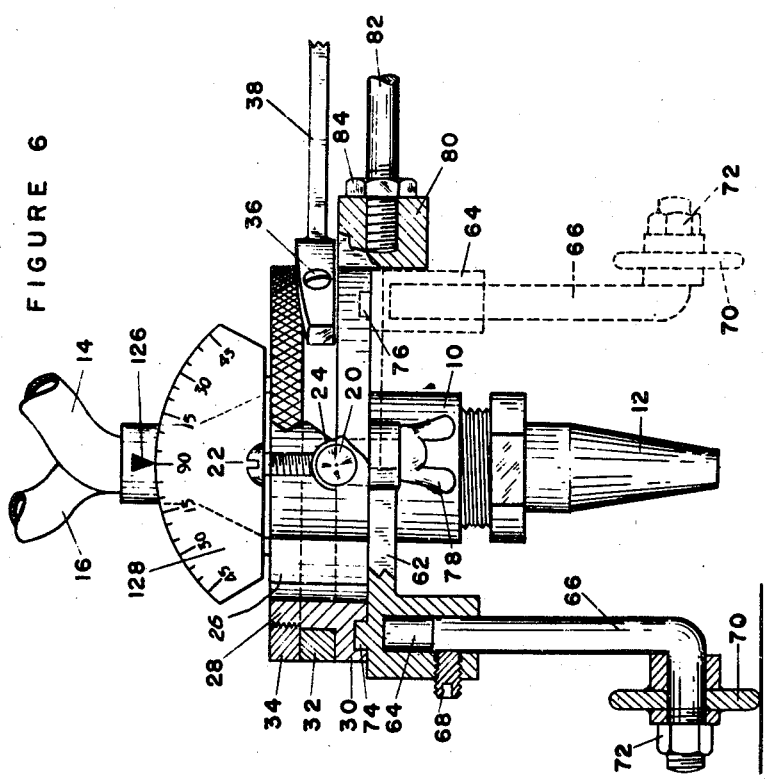
Figure 6 is an enlarged, fragmentary, side elevation, partly in section, of the torch head and guide assembly, and showing the range of adjustment of the torch head relatively to the guide assembly and, also, the positions of adjustment of the gauge wheel assembly to reverse the angles of bevel cuts.

From the foregoing, it will be apparent that the lugs 20 function as trunnions for the angular adjustment of the torch-head 10 in opposite directions from the vertical; the screws 22 being loosened for the purpose. As indicated in Figure 6, the torch-head 10 has a ninety degree range of adjustment, i. e., forty-five degrees toward and forty-five degrees away from the pivot element 88, and its angular adjustment is to be accurately determined by reference to an index 126 in cooperation with a graduated indicator plate 128, which is secured to the torch-head by means of one of the socket-head screws 22.

In a preferred makeup and operation of the cutting torch, the torch-head guiding assembly will comprise a 6⅜ inch, cold rolled, steel rod 82, 3/32 of an inch square, and grooved 5½ inches from its free threaded end; the sliding block 86; the locking block 94; and the gauge key 100, the latter being 3/32 x 3/32 x 2⅞ inches. Now, to cut a round plate 5⅞ inches in diameter, the point of the pivot element 88 will be adjusted, by the proper setting of the slide block 86 on the rod 82 and of the gauge key 100 in the groove 102, to a distance 3 3/16 inches from the center of the tip 12. With the plate heated to a desired degree, the cut is to be started directly toward the point of the pivot element 88 until the slide block 86 contacts the shoulder at the end of the gauge key 100, and is initiated after the handle 104 has been lowered enough to clear the gauge wheel 70 from contact with the plate. Following the contact of the gauge key 100 by the slide block 86, the circular cut is to be made with just enough inward pressure to keep the block against the shoulder of the gauge key. In this manner, the starting point of the cut on the round plate is undetectable. However, when a round hole, straight or beveled, is to be cut, the starting point of cut is just the opposite, i. e., with the block 86 in contact with the shoulder of the gauge key 100 and the torch tip movement outward from the point of the pivot element 88. In any case, the degree of torch travel is governed by the adjustment of the gauge key 100 in the gauge block 94, such being desirable to increase when cutting heavy plate metal.

In setting the torch up to make a circular cut, a slight depression is made in the surface of the metal plate to be cut to seat the point of the pivot element 88. The tip clearance from the surface of the work plate is governed by the raising and lowering of the gauge wheel 70, the set screw 68 being loosened and tightened for the purpose. For general shop use of the torch, the guide assembly can be dispensed with by removing the rod 82 with its attached parts and also the tip gauge assembly by removing the winged set screw 78 and tightening up on a winged set screw 130, the latter locking the guide ring 32 between the flange 30, of the main supporting ring 28, and the ring nut 34. The acetylene control valve 114 is removable by unscrewing in order to be serviced, either by replacement in its entirety, or for the renewal of its valve element, while the oxygen and flame control valves 118 and 122, as best shown in Figure 4, are preferably arranged in unit assembly by being mounted on a substantially circular casting 130, which seats in an annular recess, formed in the handle shell 104, and is clamped in place by a screw 132. Ordinarily, in the case of standard torches, these valves are silver soldered to the tubes within the handle structure and, hence, for the renewal or replacement thereof, the handle structure must be dismantled and, to all intents and purposes, rebuilt.

Having thus fully described my invention in a preferred embodiment and in structural and functional detail, it is to be understood that the words which I have used are words of description rather than of limitation, and that changes within the purview of the appended claim may be made without departing from the true scope and spirit of my invention in its broader aspects.

What I claim is:

In an acetylene cutting torch, including a tip and an operating handle, an arm projecting from the forward end of said handle, an annular member carried at the forward end of said arm, a second annular member rotatably supported in the first named annular member, bearings carried by said second annular member, a torch-head, trunnions carried by said torch-head engaged in said bearings, clamp means engageable with said trunnions to secure said torch-head in any one of its positions of angular adjustment, a gauge member supported from the lower side of said second annular member and adapted for contact with and vertical adjustment relatively to the work, said gauge member having the form of a vertically adjustable bracket and a work contact wheel at the lower end of the bracket, an arm pivotally supported on the under side of said second annular member and carrying said bracket, said arm being movable from one side of said second annular member to the opposite side thereof to effect a change of position of the gauge member, means for securing the arm in either of its set positions, a rod extending horizontally from said second annular member below said arm, a pivot supported from said rod and engageable with the work, said rod being movable endwise relatively to said pivot, and an adjustable member mounted on said rod to limit the working movement of said torch-head relatively to said pivot.

JAMES B. MINER.

REFERENCES CITED

The following references are of record in the file of this patent:

UNITED STATES PATENTS

| Number | Name | Date |
|---|---|---|
| 1,553,508 | Cloud | Sept. 15, 1925 |
| 1,684,476 | Cullen et al. | Sept. 18, 1928 |
| 2,170,305 | Ingwersen | Aug. 22, 1939 |

FOREIGN PATENTS

| Number | Country | Date |
|---|---|---|
| 501,146 | Germany | June 30, 1930 |